United States Patent [19]
Gladwin

[11] 3,800,660
[45] Apr. 2, 1974

[54] APPARATUS FOR MILLING LARGE RADIUS CURVES

[76] Inventor: Floyd R. Gladwin, 21000 E. River Rd., Grosse Ile, Mich. 48138

[22] Filed: Jan. 2, 1973

[21] Appl. No.: 320,106

[52] U.S. Cl............... 90/13 R, 90/DIG. 2, 90/24.3, 90/31, 90/37, 82/2 D
[51] Int. Cl............................ B23c 1/16, B23d 1/30
[58] Field of Search .......... 90/DIG. 2, 24.3, 31, 37, 90/13 R; 82/2 D

[56] References Cited
UNITED STATES PATENTS
287,838    11/1883    Lougee.............................. 90/24.3

Primary Examiner—Francis S. Husar
Attorney, Agent, or Firm—Cullen, Settle, Sloman & Cantor

[57] ABSTRACT

Apparatus for milling a large radius curved face on a large metal plate, comprising a horizontally reciprocating table upon which the plate is secured, with a long cross-member extending transversely of the table, and a short slider mounted upon the cross-member for movement transverse of the table, with a rotating milling cutter mounted upon the slider and extending downwardly for milling the face of the plate as it reciprocates beneath the cross-member. Two sets of long tracks are fastened upon and extend along the upper and lower edges of the cross-member, each set having a pair of oppositely curved surfaces vertically aligned with a curved track surface of the other set to form two pair of upper and lower vertically aligned, oppositely curved, i.e., concave and convex surfaces of curvatures corresponding to the curved surface to be formed upon the plate. Corresponding pairs of short, curved surface guide bars are mounted upon the slider, with the bars being transversely movable relative to the slider so as to engage only one pair of vertically aligned track surfaces at a time, whereby the slider is supported for movement along the track surfaces and the slider and cutter may thereby be moved along either a convex or concave path across the plate for alternatively cutting either a concave or convex face surface upon the reciprocating plate.

6 Claims, 6 Drawing Figures

APPARATUS FOR MILLING LARGE RADIUS CURVES

BACKGROUND OF INVENTION

The apparatus herein is of the same general type as that disclosed in my prior U.S. Pat. No. 3,464,314 of Sept. 2, 1969. This type of apparatus is used for milling a curved surface, such as on the order of a 40 foot diameter curve upon the face of a large, flat metal plate, as for example, a plate which is two feet by four feet by several inches in thickness. The curved surface may be either concave or convex.

Such type plates are used, for example, as guides and dies in the casting of steel ingots and the like. In such die uses, accuracy of the curvature must be closely maintained.

In the apparatus disclosed in my prior patent, the guide tracks or rails which form the means for controlling the curvature cut upon the plate surface, tend to wear out relatively rapidly, and thus, accuracy of the finished milled plate surface is difficult to maintain, at least to close tolerances. Moreover, in such prior apparatus, it is more expensive to form the type of guide rails disclosed and these must be changed relatively often for dimensional accuracy thereby requiring machine down time and the use of expensive labor.

In the apparatus of the present device, wear of the curve guiding track parts is considerably reduced since here the cutter is guided or moved along tracks to a much lesser degree than in the prior disclosure where the workpiece was guided or moved upon tracks more rapidly and more often.

Thus, the invention herein is concerned with a milling apparatus for providing the large curvature surfaces upon plates as described above, but in a manner which makes it possible to maintain considerably greater accuracy or closer tolerance than that of past devices and to do so at a much lower expense.

SUMMARY OF INVENTION

The apparatus herein includes a horizontally reciprocating table upon which the workpiece, in the form of a large, flat metal plate is secured, for reciprocating beneath a cross-member which is arranged transversely to the path of movement of the table. A small size slider carrying the milling cutter is slidably supported upon the cross-member for moving transversely to the path of reciprocation of the table. Thus, as the workpiece reciprocates beneath the cutter, the cutter mills a line along the length of the workpiece and thereafter, the cutter is moved incrementally transversely of the reciprocating workpiece to cut successive lines which together form a curved surface upon the workpiece.

The cutter is guided for its incremental movement along a curved path by means of curved guide tracks or rails mounted upon the cross-member which support correspondingly curved guide bars mounted on the slider for guiding the slider in a curved path.

The guide tracks upon the track member and the guide bars on the slider are formed in pairs to alternatively produce either convex or concave curvalinear movement of the slider, and the cutter, relative to the surface of the workpiece so as to mill either a concave or convex surface thereon. For that purpose, the guide bars which mount the slider upon the guide tracks are formed for movement for selectively engaging upon the appropriate guide tracks of the cross-member as desired.

Summarizing, the invention herein contemplates providing a means for moving the cutter in a curved path, either convex or concave relative to the surface of the workpiece which reciprocates beneath it and to utilize interengaging tracks or rails or bars mounted upon the slider and cross-member, with the guide bars on the slider being selectively movable for engagement with appropriate ones of the tracks on the cross-member for movement of the slider in either a convex or concave path as required, thereby appropriately moving the cutter relative to the workpiece.

In this manner, pairs of tracks and guide bars may be made to produce matched pairs of workpieces whose faces are convex and concave to predetermined dimension, with the tracks and guide bars being changeable for producing different curves upon pairs of workpieces.

These and other objects and advantages of this invention will become apparent upon reading the following description, of which the attached drawings form a part.

DESCRIPTION OF DRAWINGS

FIG. 1 is a perspective view of the apparatus herein.

FIG. 2 is an enlarged cross-sectional view taken in the directions of arrows 2—2 of FIG. 1 showing the slider mounted upon the cross-member.

FIG. 3 is a view of the cross-member with the slider in cross-section, taken in the direction of arrows 3—3 of FIG. 2, but to a reduced scale.

FIG. 4 is a perspective disassembled view of the slider drive screw and connection between such screw and the slider.

FIGS. 5 and 6 are cross-sectional views of a portion of the slider and cross-member showing the slider bars in two different positions for moving the slider alternatively in convex and concave curvalinear paths.

DETAILED DESCRIPTION

Referring to FIG. 1, the curve milling apparatus, generally designated 10, includes an elongated bed or support 11 upon which guide rails 12 are mounted to guide a reciprocating table 13 having guide grooves 14 engaging the rails for reciprocating movement along the length of the bed. The means for reciprocating the table is omitted for illustration purposes as any suitable mechanism may be utilized, as for example, the one disclosed in my prior U.S. Pat. No. 3,464,314, mentioned above.

A workpiece 15 is securely fastened upon the upper surface of the table 13 as by means of suitable bolts or brackets or the like (not shown). The workpiece may be in the form of a large, originally flat metal plate, such as in the order of two or three feet by three or four feet in size and of several inches in thickness. The upper, exposed surface 16 of the workpiece is intended to be milled into a curved surface, either convex or concave as required.

Where these plates are used as dies in the continuous casting of steel ingots they are used in opposing, matched pairs, one having a convex face and the other a concave face and with the faces being of large diameter curvatures, such as in the order of 30 to 40 feet or so in diameter. Thus, the apparatus herein is formed to

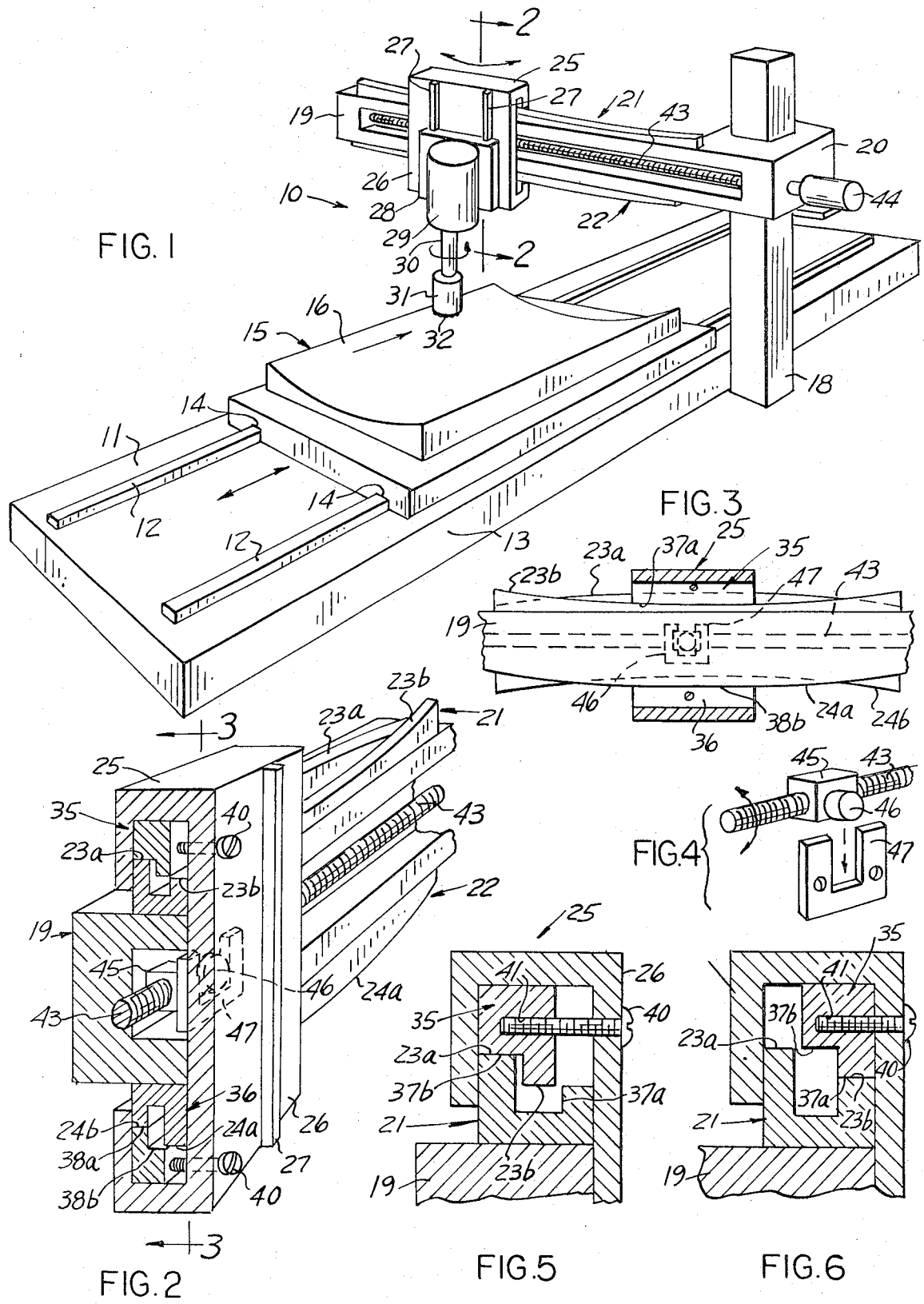

of and being correspondingly curved for face to face contact with one of said tracks;

and means for moving the slider at a controlled rate along the length of said cross-member, whereby the slider and thus the milling cutter are gradually moved along an arcuate path transversely to the reciprocating workpiece to thereby mill a large radius curved surface thereon.

2. An apparatus as defined in claim 1, and including a second pair of tracks arranged parallel to the first pair upon said cross-member, but with the track surfaces of the second pair of tracks being curved convexly and concavely in reverse directions to their respective adjacent tracks;

and a second pair of slide bars upon the slider shaped for sliding in contact with said second track surfaces, but arranged in a plane alongside of said second track surfaces;

and means for sliding the guide bars transversely to their lengths for disengaging one pair of guide bars from their track surfaces and simultaneously engaging the second pair of guide bars with their respective track surfaces instead, for thereby permitting movement of the slider and milling cutter in an opposite arcuate direction.

3. An apparatus as defined in claim 2 and said pairs of tracks being spaced apart a predetermined distance, and said slide bars being closely arranged and joined together along their lengths so that one pair of guide bars engage their respective tracks while the second pair of guide bars are arranged in the space between the tracks.

4. An apparatus for milling large radius curves upon the surface of a large plate-like workpiece comprising:

a reciprocating table upon which the workpiece is secured;

a cross-member spaced above and extending over the table transversely to its direction of reciprocation;

a slider supported upon the cross-member for sliding movement along the length of the cross-member and having tool means mounted thereon for operating upon the surface of the workpiece as it reciprocates beneath the cross-member;

a pair of spaced apart, elongated, vertically aligned tracks secured upon and extending along the length direction of said cross-member, with one track being concave and the other track being correspondingly convex, and with their radii of curvature being of a predetermined large diameter;

said slider having a pair of slide bars which are short relative to the length of the tracks, each slide bar arranged to rest against and slide along the length of and being correspondingly curved for face to face contact wth one of said tracks;

said slider being movable along the length of said cross-member for thereby moving said tool means along an arcuate path transversely to the reciprocating workpiece to thereby form a large radius curved surface thereon.

5. An apparatus as defined in claim 4, and including a second pair of tracks arranged parallel to the first pair upon said cross-member, but with the second pair of tracks being curved convexly and concavely in reverse directions to their respective adjacent first mentioned tracks;

and said slider having a second pair of slide bars for sliding in contact with said second track surfaces, but arranged in a plane alongside of said second track surfaces;

and means for sliding the guide bars transversely to their lengths for disengaging one pair of guide bars from their tracks and simultaneously engaging the second pair of guide bars with their respective tracks instead, for thereby permitting movement of the slider and tool means in an opposite arcuate direction.

6. An apparatus as defined in claim 5 and said pairs of tracks being spaced apart a predetermined distance, and said slide bars being closely arranged so that one pair of guide bars engage their respective tracks while the second pair of guide bars are arranged in the space between the adjacent tracks.

* * * * *